W. B. TURNER.
STAKING OR PERCHING MACHINE.
APPLICATION FILED FEB. 15, 1905. RENEWED AUG. 28, 1911.
1,016,657.
Patented Feb. 6, 1912.
6 SHEETS—SHEET 1.
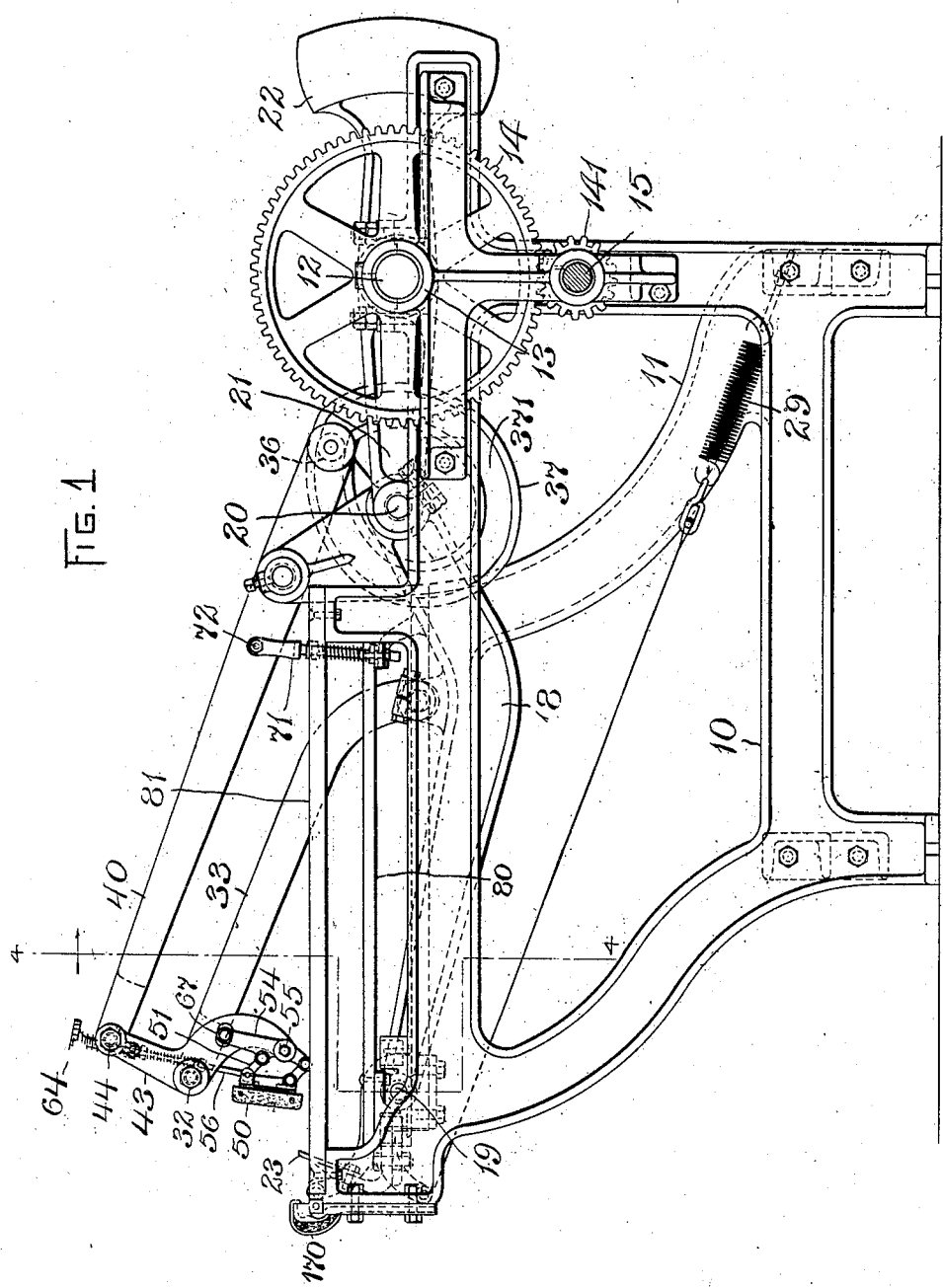
WITNESSES:
Walter P. Abell.
Laurence E. Kennedy.
INVENTOR:
W. B. Turner
by Wright Brown Quinby
his attys

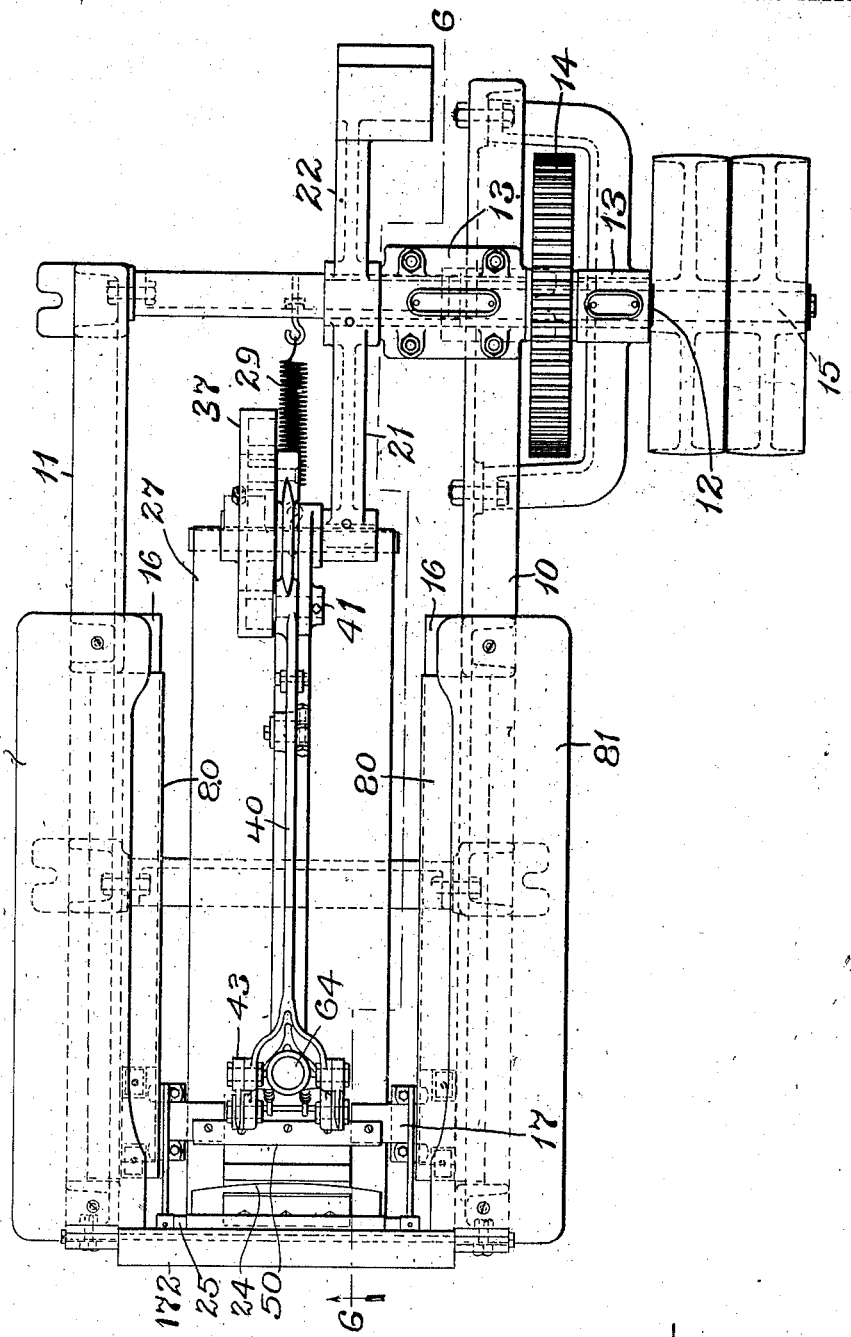

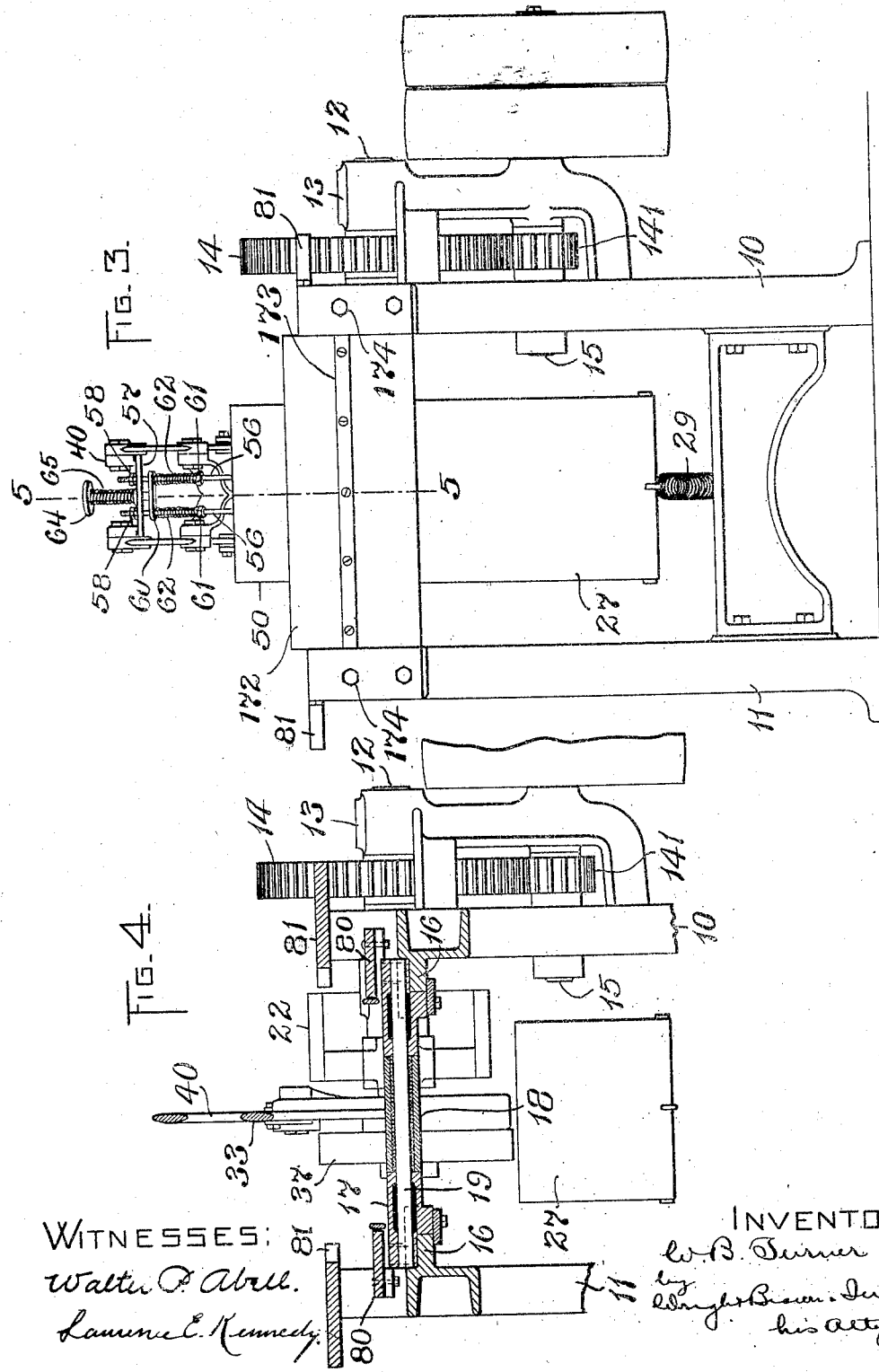

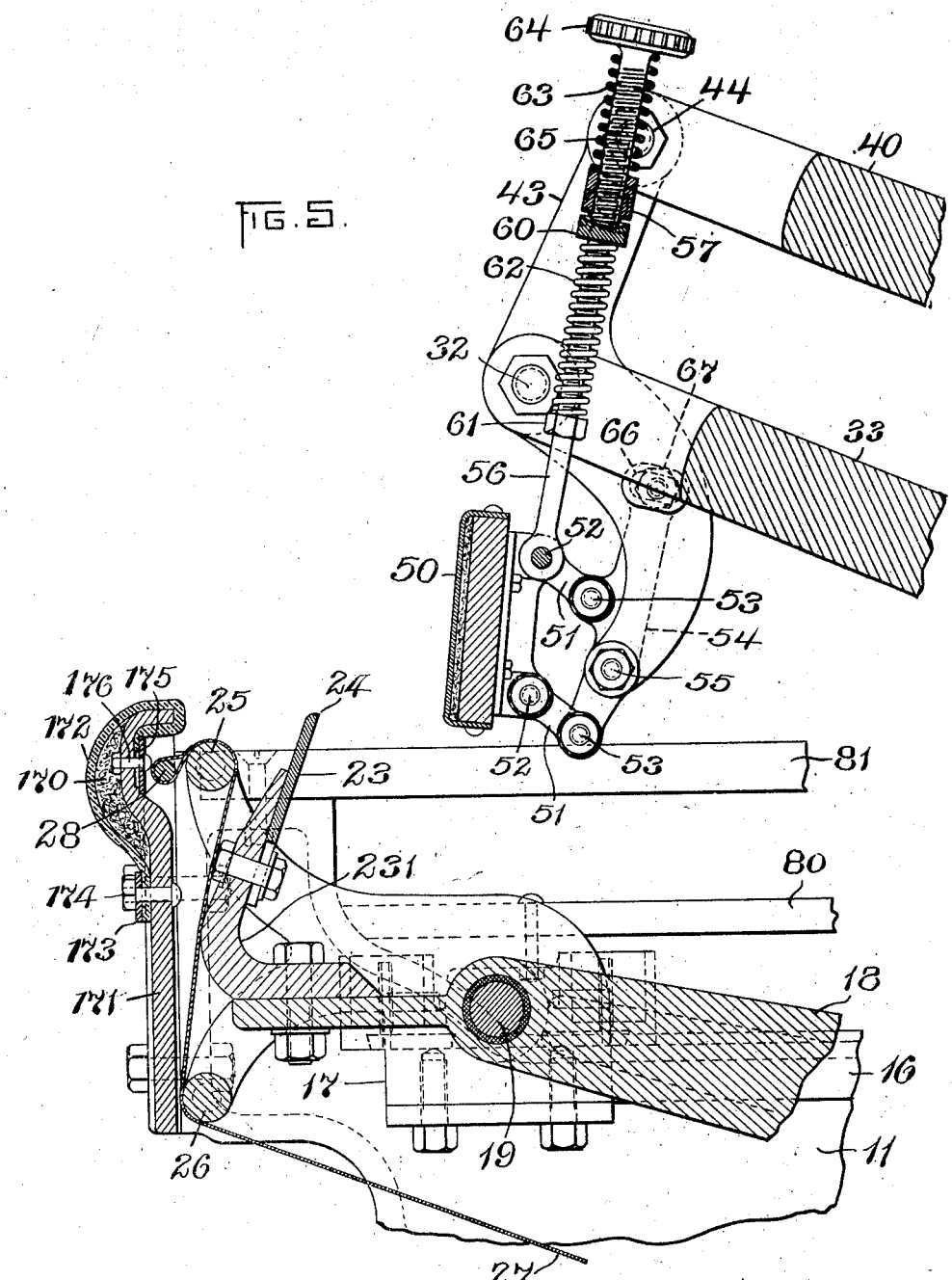

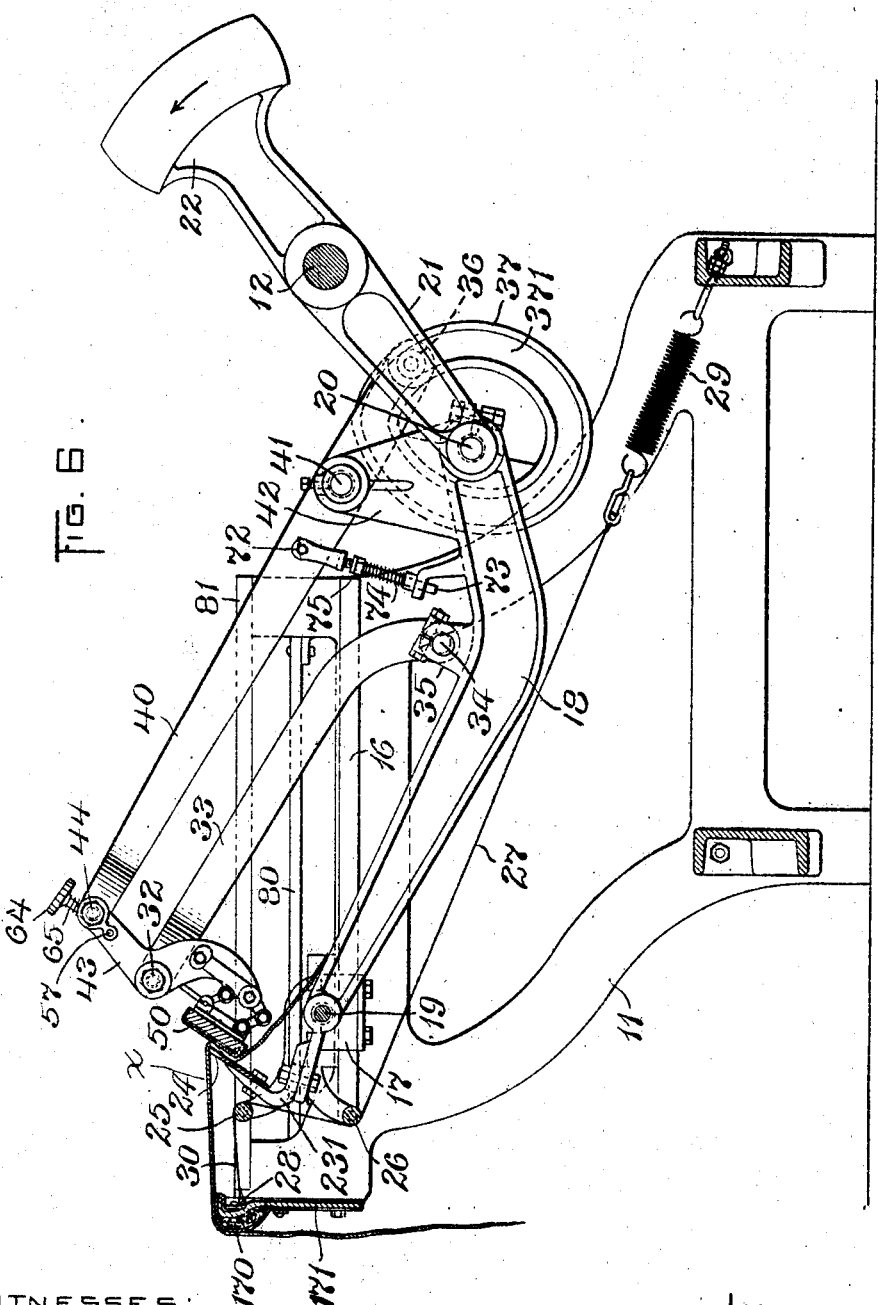

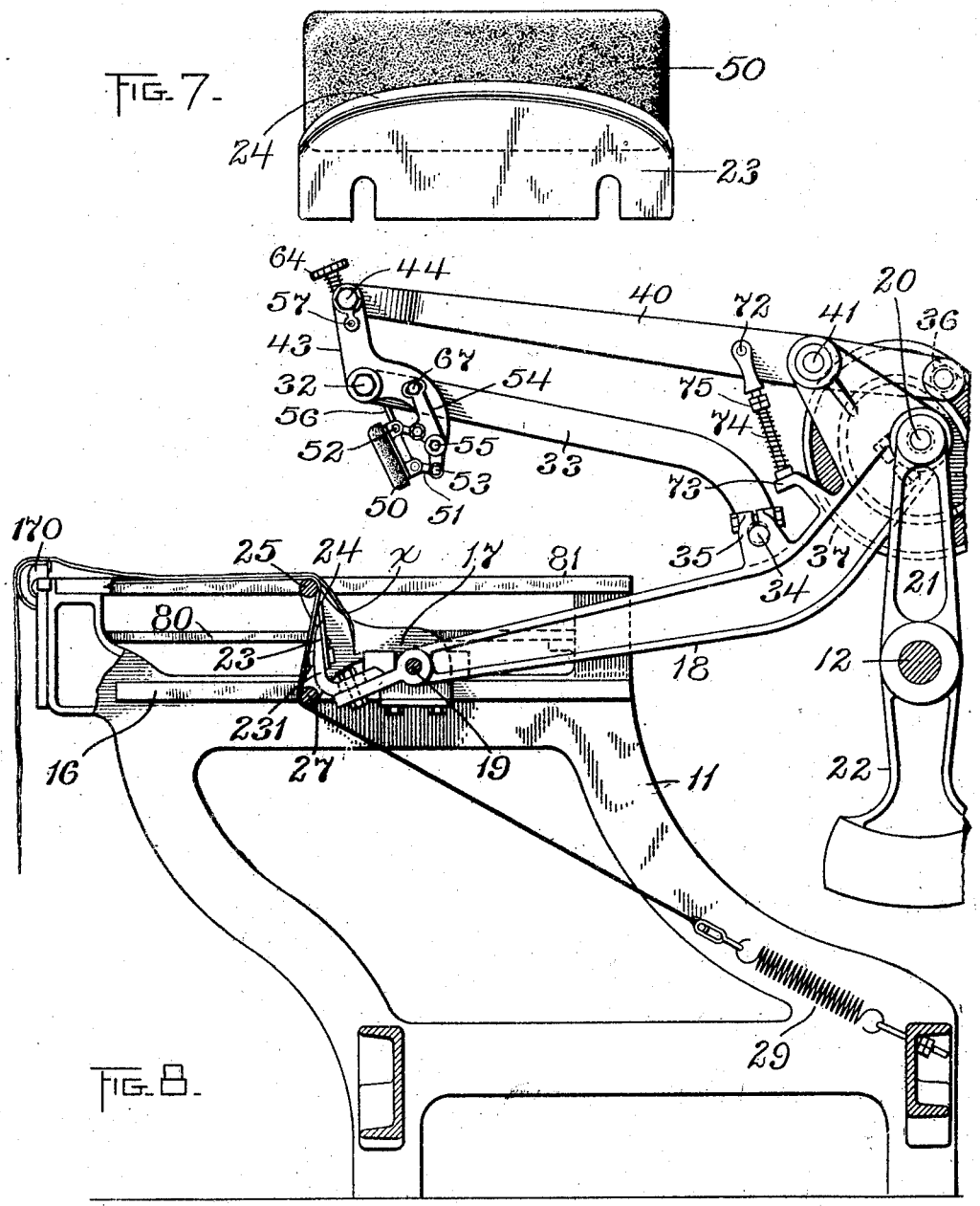

UNITED STATES PATENT OFFICE.

WILLIAM B. TURNER, OF MELROSE, MASSACHUSETTS, ASSIGNOR TO THE TURNER TANNING MACHINERY COMPANY, OF PEABODY, MASSACHUSETTS, A CORPORATION OF MAINE.

STAKING OR PERCHING MACHINE.

1,016,657.  Specification of Letters Patent.  Patented Feb. 6, 1912.

Application filed February 15, 1905, Serial No. 245,708. Renewed August 28, 1911. Serial No. 646,415.

*To all whom it may concern:*

Be it known that I, WILLIAM B. TURNER, of Melrose, in the county of Middlesex and State of Massachusetts, have invented certain new and useful Improvements in Staking or Perching Machines, of which the following is a specification.

This invention has relation to staking or perching machines, and it has for its object to provide a machine which will accomplish the operation of stretching and softening the leather and opening the pores thereof, as nearly as possible like the hand operation.

A further object of the invention is to provide a machine which is more highly efficient than those hitherto constructed which is simple in construction and which operates swiftly and noiselessly without jar.

Of the accompanying drawings:—Figure 1 is a right side elevation of a staking machine, constructed in accordance with the invention. Fig. 2 is a plan view thereof. Fig. 3 is a front elevation. Fig. 4 is a vertical section on the line 4—4 of Fig. 1. Fig. 5 is a vertical section on the front end of the machine, showing on a larger scale the parts in the same position as in Fig. 1, (see line 5—5 of Fig. 3). Fig. 6 is a longitudinal vertical section on the line 6—6 of Fig. 2, except that the parts are in another position. Fig. 7 is a face view of the two coöperating staking members. Fig. 8 illustrates the position of the staking-members during the return stroke.

The same reference characters indicate the same parts or features, wherever they occur.

The machine illustrated on the drawings as embodying the invention comprises a frame having side standards 10 11 connected by suitable cross-braces. At the rear end of the standard 10 there is a main shaft 12 which is journaled in bearings 13 afforded by the standard 10 and by a bracket attached thereto. The said shaft 12 is driven by a pinion 141 and a gear 14 from a pulley shaft 15 which is adapted to be driven in the usual way by a belt. The shaft 12 transmits motion to the staking member, as will be subsequently explained. The side standards 10 and 11 are provided on their inner faces with guides 16 16 extending horizontally from front to rear. Slidingly mounted in said guides is a slide or carriage 17. The said carriage is provided with a pin 19, to which is pivoted the forward end of a pitman 18 which constitutes a staking arm or jaw. The rear end of the said pitman is pivoted upon a crank-pin 20 rigidly affixed to a crank 21 attached to the inner end of the shaft 12 midway between side standards 10 and 11. The crank has a weighted arm 22, diametrically opposite thereto which counterbalances the weight of the pitman and the mechanism actuated by the crank. The forward end of the pitman 18 extends a short distance beyond the pin 19 and to it is secured a holder 231 which is adjustable longitudinally thereon. The said holder is bent at an inclination and to it is rigidly and adjustably secured a staking or perching member which is herein termed a staking-blade. The said blade extends from side to side of the frame and its upper or working edge is convex as at 24, (see Fig. 7). As the shaft 12 rotates, the carriage 17 is reciprocated in the frame and the staking blade is oscillated about the pin 19 and is also reciprocated longitudinally of the frame. This oscillation of the staking blade causes a constantly varying inclination thereof relatively to the stretched skin, for a purpose to be subsequently explained. The carriage 17 also carries two idle rolls 25 and 26 mounted one above the other and extending from side to side thereof. An apron or work-support 27, of which the forward end is affixed at 28 to the frame of the machine extends over the roll 25 and under the roll 26, and is held taut by a spring 29 connected at its rear end to the rear end of the frame. By reason of this construction, the apron provides a work-supporting portion 30 between the front end of the frame and the staking-blade, and inasmuch as the roll 25 moves horizontally with said blade and determines the length of said portion 30, the operative portion of the apron presents a substantially stationary work-support which is increased and decreased in length with the reciprocation of the staking-blade. The height of the portion 30 is such that during the rearward or working stroke of the blade, the edge 24 rises above the portion 30 on account of its oscillating movement already mentioned, and during its forward or return stroke, the said edge rocks below the level of said portion, thereby avoiding contact with the skin *x*, as shown by Fig. 8. The loose end of the skin, during the return stroke of the chafing-blade extends over the latter and rests upon the pitman 18.

The staking member which coöperates with the blade 24 consists of a pad or clamp 50. It is formed with a rigid backing or body of wood or other suitable material, and its flat face is covered with a layer of cushioning material, such as felt, hair, or the like, and a cover of suitable flexible wear-resisting material, such as soft leather. Preferably the pad is substantially rectangular in face view and it presents a substantially flat yielding surface for coaction with the staking-blade 23. At each end the body of the pad is supported by parallel links 51 of equal length connected thereto by pivot-pins 52 52. The said links are pivoted by pins 53 53 to two members 54, one at each end of the pad, said members 54 being pivotally mounted upon studs 55 on a hanger 43. The said members 54 are adjustable about the stud 55 to adjust the pad relatively to the staking blade, being secured after adjustment by screws 67 which pass through curved slots in the said members 54. Connected to the upper pin 52 are two threaded rods 56 which project upwardly through a cross-bar 57 extending from side to side of the hanger 43. Nuts 58 on the rods 56 bear against the upper face of the cross-bar 57 and thereby support the pad 50 which is otherwise loosely held by the links 51. By this construction the pad is adapted to yield upwardly and backwardly by a parallel motion, thereby lifting the rods 56 relatively to the cross-bar 57.

For the purpose of resisting the upward and rearward movement of the pad 50, the rods 56 are passed loosely through a cross-bar 60 and between said cross-bar and adjustable nuts 61 on the rods 56 are placed helical springs 62. For the purpose of varying the tension of these springs, a set-screw 63 is threaded through the cross-bar 57 midway between the rods 56 and bears upon the upper face of the cross-bars 60. The said set-screw is provided with a milled head or hand-wheel, and it is held firmly against rotation under normal conditions by a spring 65 which is coiled about it and compressed between the head and the cross-bar. By virtue of this construction, it will be seen that the pad may be adjusted relatively to the blade and that the pressure with which it is held in place may be varied, as desired.

The hanger 43 comprises two side bars which are pivotally connected at 32 and 44 to two substantially parallel members 33 and 40 respectively. The lever 40 constitutes a staking arm or jaw. At its rear end, the link 33 is pivotally connected to the pitman 18, said pitman being bent as shown in Fig. 6, and the pivot 34 being located at the bend. The lever 40 is fulcrumed upon a pin 41 which is supported by a bracket 42 rising from the rear end of the pitman 18. Thus the two members 33 and 40 are both supported by the pitman so that as the pitman is actuated by the crank, they are given a similar back and forward movement, and hence the reciprocation of the two staking members is simultaneous. Novel mechanism is provided for moving said staking members into and out of coacting relation. This mechanism comprises a path-cam 37 which is rigidly secured to the crank pin 20. In the face of this cam is the cam-path 371 into which projects a roll 36 on the shorter end of the lever 40. The pivot or fulcrum 41 for the lever 40 is in a vertical transverse plane slightly in advance of the crank-pin 20, but somewhat in the rear of the vertical transverse plane of the fulcrum or pivot 34 for the link 33. For each rotation of the crank-shaft 12, the cam 37 is caused to make one rotation relatively to the roll 36, since the cam and the crank-pin 20 are rigidly secured to the crank 21. The cam-path 371 which is more or less conventionally illustrated, is so formed that prior to the rearward stroke of the members, the two members are caused to approach each other to approximately the position shown in Fig. 6, and to remain closed until they have nearly completed the rearward stroke, after which they are separated to a position shown in Fig. 8, remaining so separated as they move forward until they reach the position shown in Fig. 5, whereupon the cam causes them to approach each other to the position illustrated in Fig. 6. The link 33 and lever 40 constitute a parallel motion or parallel links for supporting the hanger, but they are of unequal length, and are so connected to the pivots 41, 44, 34 and 32 that the pad 50 is given a motion in lines substantially perpendicular to the face of the pad, as well as a motion in lines substantially parallel to said face, whereby the blade is caused to overlap the pad and at the same time the pad is pressed yieldingly against the rear face of the blade so as to yieldingly grip the skin.

The coöperating faces of the two staking members are so adjusted that they are parallel through their operative stroke. This adjustment can be secured through the mechanism previously referred to, including the members 54 and the bolts 67 passing through the slots 66.

The link 33 may be longitudinally adjusted by means of the stud 34 which is eccentrically constructed, so that, during the forward thrust of the hanger 43, caused at the beginning of the working stroke by the difference in length of the link 33 and the lever 40, the pad 50 impinges upon the skin overhanging the blade 23 before the completion of the said thrust. This effects a yielding motion of the pad 50 relatively to the hanger, but inasmuch as the said pad is hung on parallel links, as already stated, the parallel relation to the pad and blade are unchanged.

The crank-shaft rotates in the direction of the arrow in Fig. 6, and as the lower end of the pitman drops through an angle of 90 degrees, the coacting faces of the blade and the pad are inclined farther and farther from the vertical and from an approximately right angle to the stretched skin to an obtuse angle relatively thereto. This varying inclination of the faces of the members causes them to operate with the greatest efficiency upon the skin to soften it and open the pores thereof.

It is evident that the parts which the cam 37 has to move are nearly all on one side of the fulcra 41 and 34, so that their weight constitutes a heavy load on the cam. In order to relieve the cam of the greater part of this dead weight, the pitman is provided with a yielding cushion for supporting the lever 40, and the parts carried thereby. Said cushion comprises a plunger 71 pivoted at 72 to the lever 40 and extending downwardly through an aperture in the lug 73 on the pitman 18. The plunger is free to move relatively to the said lug, and is normally held upward by a helical spring 74 coiled thereabout and arranged between said lug and a nut or collar 75 adjustably secured to the plunger. This contrivance, in addition to counterbalancing the weight of the lever 40, the hanger 43, and the link or lever 33, steadies all of these members and prevents "rattling".

In order that the operator may hold the skin against an abutment while the staking or perching members are operating on it, there is across the front of the frame a cross-plate 171, secured to the side standard by bolts or screws, and having its upper portion swelled forwardly and covered with a cushion or pad 170 of felt or other resilient or cushioning material. A rubber cover 172 is provided for the cushion, the lower edge of the cover being secured in place by a cross-bar 173 through which are passed bolts 174 and the upper edge of which is folded around the upper edge of the plate 171 and secured in place by a cross-bar 175 and bolts 176. The operator holds the skin by clamping it between his body and the cushion. The cross-bar 28, which supports the forward end of the apron is located within the recess formed by the upper part of the cross-plate 71.

For the purpose of preventing dirt or bits of leather from dropping upon the guides 16, the machine is provided with movable guards 80 which overlap the said guideways, as illustrated in Fig. 4. Upon the upper edges of the standards are secured flat supports 81 which project laterally therefrom to constitute lateral stationary wings to support that portion of the skin which projects laterally from the extensible apron or support. These stationary portions of the table are arranged, so that their upper surfaces are substantially flush with the surface of the operative portions of the apron.

In accordance with the foregoing description, it will be seen that the staking members are respectively supported by pivotally-connected arms or jaws 18 and 40, to which the crank is directly connected, and that said arms or jaws are opened and closed by means, to wit,—the cam, rigidly secured upon the crank. While I prefer to employ as an addition, the link 33, to cause a bodily movement of the pad in lines angular to the face of the blade, yet if this were omitted, the hanger 43 would be rigidly mounted on the end of the jaw 40, and the machine would operate, though perhaps not so satisfactorily as with the link.

It has, in actual practice, been customary in staking or perching machines to employ a crank which was connected to the jaws or staking arms by a pitman, means being provided at the end of the pitman for opening and closing the jaws, but in accordance with the present invention, the crank is connected directly to one of the staking jaws, which is itself the pitman, whereby I am enabled to greatly reduce the length of the machine and to simplify the construction thereof.

By mounting the staking-blade directly upon the end of the pitman, the oscillation, as well as the reciprocation of the blade is secured as hereinbefore described. Since the pad-carrying jaw is mounted upon the pitman, that is, pivotally connected to it, the two jaws operate as a unit, whereby the faces of the pad and the blade preserve their parallel relation during their operative stroke. This parallel relation, however, is destroyed during the forward stroke of the members by providing the link 33, its projection causing the members to first overlap and then to move to clamping relation.

It has hitherto been proposed to employ an extensible support in front of the staking members to support the skin but this was in connection with a table which projected rearwardly from the jaws, and not in connection with a blade so mounted as to drop below the surface of the support in front of the members.

By constructing the machine as herein described, with the operative portion of the support in parallelism with the side wings of the table, and without any support in the rear of the jaws, the skin is not carried forward upon the return stroke of the members, but is allowed to drop behind or in the rear of the members as the members move forward, this being assisted by the depression of the operative edge of the blade as the blade is carried toward the operator.

In addition to the advantages herein enumerated, the machine has others which are apparent to those skilled in the art to which the invention relates.

I desire to have it understood that the invention is not limited to the particular details of construction of the machine which is illustrated upon the drawings and herein described, and further that the phraseology which I employ is for the purpose of description and not of limitation.

Having thus explained the nature of the invention, and described a way of constructing and using the same, although without attempting to set forth all of the forms in which it may be made, or all of the modes of its use, I declare that what I claim is:—

1. In a staking or perching machine, two staking members, one consisting of a rigid flat metallic blade over which the skin may be folded, and the other consisting of a flat pad whose face is complemental to the face of the blade, said pad being formed of a backing, a cushion of yielding material and a flexible wear-resisting cover therefor, and mechanism for causing said members automatically to move into and out of overlapping position, substantially as set forth.

2. In a staking or perching machine, a blade with an edge over which the skin may be folded, a clamp having a face for clamping the skin against the face of the blade, and a parallel link connection for yieldingly supporting said clamp to permit it to move rearwardly away from said blade, without varying the relation of the faces of the blade and the clamp.

3. In a staking or perching machine, a blade with an edge over which the skin may be folded, a clamp having a face for clamping the skin against the face of the blade, a parallel link connection for yieldingly supporting said clamp to permit it to move rearwardly away from said blade without varying the relation of the faces of the clamp and the blade, and means for moving the clamp into parallelism with and overlapping said blade, and operating them while in parallelism.

4. In a staking or perching machine, staking members, jaws for said members, a rotary crank for reciprocating said jaws pivoted directly to one of them, and means on and rigidly secured to said crank for relatively moving said jaws to open and close said members.

5. In a staking or perching machine, staking members, jaws for said members, a rotary crank for reciprocating said jaws and pivoted directly to one of them, and a cam rigidly secured on said crank and rotatable therewith to move said jaws toward and from each other to open and close said staking members.

6. In a staking or perching machine, staking members, pivotally connected jaws for supporting said members, a crank connected directly to one of said jaws to reciprocate them, and a cam on said crank engaging one of said jaws to move it relatively to the other.

7. In a staking or perching machine, staking members, a slide, a crank, a jaw pivoted to said slide and to the crank, said jaw carrying one of said staking members, a second jaw pivoted to said first-mentioned jaw and carrying the other staking member, and means for moving said last-mentioned jaw relatively to the first-mentioned jaw to open and close the said staking members.

8. In a staking or perching machine, staking members, a slide, a crank, a jaw pivoted to said slide and to the crank, said jaw carrying one of said staking members, a second jaw pivoted to said first-mentioned jaw and carrying the other staking member, and a cam on said crank for actuating said last-mentioned jaw.

9. In a staking or perching machine, staking members, a slide, a crank, a jaw pivoted to said slide and to the crank, a holder on said jaw for carrying one of said staking members, a second jaw connected to the first-mentioned jaw, and having a pivoted hanger or holder for the other staking member, a link connected to said hanger or holder and to said first-mentioned jaw, and means on the crank for moving said second-mentioned jaw relatively to the first-mentioned jaw.

10. In a staking or perching machine, a slide, a crank, a jaw pivoted to the slide and to the crank, and having a staking blade rigidly attached thereto, a second jaw pivoted to the first-mentioned jaw, means on the crank for opening and closing the jaws, and a staking pad adapted to coact with said blade and yieldingly mounted upon said second-mentioned jaw.

11. In a staking or perching machine, complemental staking members, two staking jaws pivotally connected, a slide to which the forward end of one of said jaws is pivoted, a crank having a bearing in the rear end of said last-mentioned jaw, and means for automatically opening and closing said jaws.

12. In a staking or perching machine, a main frame having guideways, a slide in said guideways, a shaft having a crank, a pitman connected to the crank, a pintle pivoting the pitman to the slide, a blade rigidly mounted on the end of said pitman whereby it is both reciprocated and oscillated; a lever pivoted to the pitman, a staking member complemental to the blade attached to said lever, and a cam on the crank for engaging the said lever.

13. In a staking or perching machine, a main frame having guideways, a slide in said guideways, a shaft having a crank, a pitman connected to the crank, a pintle pivoting the pitman to the slide, a blade rigidly mounted on the end of said pitman whereby it is both reciprocated and oscillated, a lever pivoted to the pitman, a staking member complemental to the blade pivoted to the said lever, a link pivoted to both said staking member and the pitman, and a cam rigidly affixed to the crank and engaging the said lever for actuating it.

14. In a staking or perching machine, staking jaws, a blade on one of said jaws, a hanger or support on the other jaw, a clamp having a face for pressing a skin doubled over the edge of the blade against the face thereof, parallel links connecting the said clamp to the hanger or holder, and a spring exerting a tension against said clamp.

15. In a staking or perching machine, staking jaws, a blade on one of said jaws, a hanger or support on the other jaw, a clamp having a face for pressing a skin doubled over the edge of the blade against the face thereof, parallel links connecting the said clamp to the hanger or holder, tension-means for said clamp, and means for adjusting said clamp angularly with reference to the face of the blade.

16. A staking or perching machine having a pair of coöperating staking members comprising a movably and rigidly mounted staking blade, and a resilient complemental member, a yielding support for said resilient member comprising parallel links, means for moving said resilient member into and out of coöperative relation with said staking blade, said parallel links being adapted to maintain said resilient member parallel with relation to said staking-blade when in coöperative relation therewith, and means for moving said members as a unit to operate upon the work.

17. In a staking or perching machine, the combination with a frame, a slide thereon, staking members of which the lower one has a blade; jaws supporting said staking members the lower jaw being pivoted to said slide and carrying said blade; a flexible support attached to said frame, and coöperating with said slide, with which it is in sliding engagement to provide an extensible support in front of said blade for the skin and a crank connected to said jaws for operating them, said parts being constructed and arranged whereby the operative edge of the said blade is oscillated at points above and below the operative portion of the said support.

In testimony whereof I have affixed my signature, in presence of two witnesses.

WILLIAM B. TURNER.

Witnesses:
  M. B. May,
  C. C. Stecher.